(12) United States Patent
Srivastava et al.

(10) Patent No.: US 11,150,620 B2
(45) Date of Patent: Oct. 19, 2021

(54) MOBILE GATEWAY DEVICE FOR CONTROLLING BUILDING EQUIPMENT

(71) Applicant: Johnson Controls Technology Company, Auburn Hills, MI (US)

(72) Inventors: Abhishek Srivastava, Azamgarh (IN); Bhawna Kumari, New Delhi (IN); Vinod Saluja, Gurugram (IN); Rajeev T. Singh, Noida (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/192,226

(22) Filed: Nov. 15, 2018

(65) Prior Publication Data

US 2019/0155238 A1    May 23, 2019

Related U.S. Application Data

(60) Provisional application No. 62/587,922, filed on Nov. 17, 2017.

(51) Int. Cl.
| | |
|---|---|
| *G05B 19/042* | (2006.01) |
| *H04W 4/33* | (2018.01) |
| *H04L 29/08* | (2006.01) |
| *F24F 11/58* | (2018.01) |
| *H04L 12/28* | (2006.01) |
| *G05B 15/02* | (2006.01) |
| *G06F 3/0482* | (2013.01) |

(52) U.S. Cl.
CPC .......... *G05B 19/0423* (2013.01); *F24F 11/58* (2018.01); *G05B 15/02* (2013.01); *G05B 19/042* (2013.01); *H04L 12/2816* (2013.01); *H04L 67/125* (2013.01); *H04W 4/33* (2018.02); *G05B 2219/25011* (2013.01); *G05B 2219/2614* (2013.01); *G06F 3/0482* (2013.01)

(58) Field of Classification Search
None
See application file for complete search history.

(56) References Cited

U.S. PATENT DOCUMENTS 6,487,457 B1 * 11/2002 Hull ...................... G05B 15/02
700/17
2015/0288604 A1   10/2015 Boudreaux
2018/0309818 A1   10/2018 Park et al.

OTHER PUBLICATIONS

U.S. Appl. No. 16/142,740, filed Sep. 26, 2018, Johnson Controls Technology Company.

(Continued)

*Primary Examiner* — Carlos R Ortiz Rodriguez
(74) *Attorney, Agent, or Firm* — Foley & Lardner LLP

(57) ABSTRACT

Disclosed herein are related to a device, a method, and a non-transitory computer readable medium for controlling building equipment. In one aspect, disclosed is a mobile gateway that receives a user input to change a status of a device of the building equipment. The mobile gateway device generates a request action message indicating the user input based on an application programming interface of the mobile gateway device. The request action message conforms to a building automation and control network (BACnet) protocol. The mobile gateway device transmits, through an interne protocol network, the request action message conforming to the BACnet protocol to a BACnet controller. The BACnet controller operates the device according to the request action message conforming to the BACnet protocol.

20 Claims, 8 Drawing Sheets

(56) References Cited

OTHER PUBLICATIONS

U.S. Appl. No. 16/153,540, filed Oct. 5, 2018, Johnson Controls Technology Company.

* cited by examiner

MOBILE GATEWAY DEVICE FOR CONTROLLING BUILDING EQUIPMENT

CROSS-REFERENE TO RELATED PATENT APPLICATION

This application claims the benefit of U.S. Provisional Patent Application No. 62/587,922, filed Nov. 17, 2017, which is incorporated herein by reference in its entirety.

BACKGROUND

The present disclosure relates generally to the operation of equipment in a building, building management system (BMS), heating, ventilation and air conditioning (HVAC) system, and/or a central plant. The present disclosure relates more particularly to a mobile gateway device configured to control operation of equipment in a building, BMS, HVAC system, and/or a central plant.

A HVAC system (also referred to as "a central plant" or "an energy plant" herein) may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. The central plant may further include a HVAC controller to control operation of the HVAC devices.

In some implementation, HVAC controllers communicate through a designated network (e.g., building automation and control network (BACnet)). Configuring HVAC controllers includes employing a router device between the designated network of the HVAC controllers and an intermediate network (e.g., a master-slave/token passing (MSTP) network). A user may connect to the intermediate network through an interface controller (e.g., MSTP controller) coupled to the intermediate network, and may operate the HVAC devices through the router device, the interface controller, and the HVAC controllers. Communication through the intermediate network and the interface controller may be cost inefficient, and incur a delay for controlling the HVAC devices.

SUMMARY

Various embodiments of a mobile gateway device for controlling building equipment are disclosed. In some embodiments, the mobile gateway device includes a processing circuit comprising a processor and memory storing instructions executed by the processor. In some embodiments, the processing circuit is configured to receive a user input to change a status of a device of the building equipment. In some embodiments, the processing circuit is configured to generate a request action message indicating the user input based on an application programming interface of the mobile gateway device. The request action message may conform to a building automation and control network (BACnet) protocol. In some embodiments, the processing circuit is configured to transmit, through an internet protocol network, the request action message conforming to the BACnet protocol to a BACnet controller. The BACnet controller may operate the device according to the request action message conforming to the BACnet protocol.

In some embodiments, the mobile gateway device further includes a communication interface circuit coupled to the internet protocol network. The communication interface circuit may receive communication from the internet protocol network in the BACnet protocol and transmit communication to the internet protocol network in the BACnet protocol. The communication interface circuit may be configured to communicate with the BACnet controller through the internet protocol network according to the BACnet protocol, while bypassing communication through a MSTP network.

In some embodiments, the processing circuit is configured to receive another user input to obtain a list of operable devices of the building equipment. The processing circuit may be configured to generate a request response message requesting identifications of operable devices of the building equipment based on the application programming interface of the mobile gateway device. The request response message may conform to the BACnet protocol. The processing circuit may be configured to transmit, through the internet protocol network, the request response message conforming to the BACnet protocol to the BACnet controller. The BACnet controller may generate the list of operable devices in response to the request response message. The processing circuit may be configured to receive, through the internet protocol network, the list of operable devices of the building equipment from the BACnet controller. The processing circuit may be configured to present the list of operable devices of the building equipment. The processing circuit may be configured to receive a user selection of the device from the list. The processing circuit may be configured to transmit a target device identification identifying the device with the request action message.

In some embodiments, the processing circuit is configured to determine a list of executable actions associated with the device. The processing circuit may be configured to present the list of the executable actions of the device. The processing circuit may be configured to receive a user selection of an executable action from the list of executable actions to change the status of the device.

In some embodiments, the processing circuit is configured to receive, through the internet protocol network, status information confirming a changed status of the device. The status information may conform to the BACnet protocol. The processing circuit may be configured to render a representation of the changed status of the device.

In some embodiments, the processing circuit is configured to receive another user input to obtain a status of another device of the building equipment. The processing circuit may be configured to generate a request status message requesting the status of the other device based on the application programming interface of the mobile gateway device. The request status message may conform to the BACnet protocol. The processing circuit may be configured to transmit, through the internet protocol network, the request status message conforming to the BACnet protocol to the BACnet controller. The BACnet controller may obtain the status of the other device according to the request status message conforming to the BACnet protocol.

Various embodiments of a non-transitory computer readable medium storing instructions for controlling building equipment by a mobile gateway device are disclosed herein. In some embodiments, the instructions when executed by one or more processors cause the one or more processors to receive a user input to change a status of a device of the building equipment. In some embodiments, the instructions when executed by one or more processors cause the one or more processors to generate a request action message indicating the user input based on an application programming interface of the mobile gateway device. The request action message may conform to a building automation and control network (BACnet) protocol. In some embodiments, the instructions when executed by one or more processors cause the one or more processors to transmit, through an internet protocol network, the request action message conforming to the BACnet protocol to a BACnet controller. The BACnet controller may operate the device according to the request action message conforming to the BACnet protocol.

In some embodiments, the instructions when executed by the one or more processors cause the one or more processors to receive communication from the internet protocol network in the BACnet protocol and transmit communication to the internet protocol network in the BACnet protocol. In some embodiments, the instructions when executed by the one or more processors cause the one or more processors to communicate with the BACnet controller through the internet protocol network according to the BACnet protocol, while bypassing communication through a MSTP network.

In some embodiments, the instructions when executed by the one or more processors cause the one or more processors to receive another user input to obtain a list of operable devices of the building equipment. In some embodiments, the instructions when executed by the one or more processors cause the one or more processors to generate a request response message requesting identifications of operable devices of the building equipment based on the application programming interface of the mobile gateway device. The request response message may conform to the BACnet protocol. In some embodiments, the instructions when executed by the one or more processors cause the one or more processors to transmit, through the internet protocol network, the request response message conforming to the BACnet protocol to the BACnet controller. The BACnet controller may generate the list of operable devices in response to the request response message. In some embodiments, the instructions when executed by the one or more processors cause the one or more processors to receive, through the internet protocol network, the list of operable devices of the building equipment from the BACnet controller.

In some embodiments, the instructions when executed by the one or more processors cause the one or more processors to present the list of operable devices of the building equipment. In some embodiments, the instructions when executed by the one or more processors cause the one or more processors to receive a user selection of the device from the list. In some embodiments, the instructions when executed by the one or more processors cause the one or more processors to transmit a target device identification identifying the device with the request action message.

In some embodiments, the instructions when executed by the one or more processors cause the one or more processors to determine a list of executable actions associated with the device. In some embodiments, the instructions when executed by the one or more processors cause the one or more processors to present the list of the executable actions of the device. In some embodiments, the instructions when executed by the one or more processors cause the one or more processors to receive a user selection of an executable action from the list of executable actions to change the status of the device.

In some embodiments, the instructions when executed by the one or more processors cause the one or more processors to receive, through the internet protocol network, status information confirming a changed status of the device. The status information may conform to the BACnet protocol. In some embodiments, the instructions when executed by the one or more processors cause the one or more processors to render a representation of the changed status of the device.

In some embodiments, the instructions when executed by the one or more processors cause the one or more processors to receive another user input to obtain a status of another device of the building equipment. In some embodiments, the instructions when executed by the one or more processors cause the one or more processors to generate a request status message requesting the status of the other device based on the application programming interface of the mobile gateway device. The request status message may conform to the BACnet protocol. In some embodiments, the instructions when executed by the one or more processors cause the one or more processors to transmit, through the internet protocol network, the request status message conforming to the BACnet protocol to the BACnet controller. The BACnet controller may obtain the status of the other device according to the request status message conforming to the BACnet protocol.

Various embodiments of a method of controlling building equipment by a mobile gateway device are disclosed herein. In some embodiments, the method includes receiving, by the mobile gateway device, a user input to change a status of a device of the building equipment. In some embodiments, the method includes generating, by the mobile gateway device, a request action message indicating the user input based on an application programing interface of the mobile gateway device. The request action message may conform to a building automation and control network (BACnet) protocol. In some embodiments, the method includes transmitting, by the mobile gateway device, through an internet protocol network, the request action message conforming to the BACnet protocol to a BACnet controller. The BACnet controller may operate the device according to the request action message conforming to the BACnet protocol.

In some embodiments, the method includes receiving another user input to obtain a list of operable devices of the building equipment. In some embodiments, the method includes generating a request response message requesting identifications of operable devices of the building equipment based on the application programming interface of the mobile gateway device. The request response message may conform to the BACnet protocol. In some embodiments, the method includes transmitting, through the internet protocol network, the request response message conforming to the BACnet protocol to the BACnet controller. The BACnet controller may generate the list of operable devices in response to the request response message. In some embodiments, the method includes receiving, through the internet protocol network, the list of operable devices of the building equipment from the BACnet controller.

In some embodiments, the method includes determining a list of executable actions associated with the device. In some embodiments, the method includes presenting the list of the executable actions of the device. In some embodiments, the method includes receiving a user selection of an executable action from the list of executable actions to change the status of the device.

In some embodiments, the method includes receiving, through the interne protocol network, status information confirming a changed status of the device. The status information may conform to the BACnet protocol. In some embodiments, the method includes rendering a representation of the changed status of the device.

DETAILED DESCRIPTION

Overview

Referring generally to the FIGURES, disclosed herein are a mobile gateway device and associated methods for controlling equipment in a building, building management system (BMS), HVAC system, and/or a central plant. As used herein, the term "building equipment" refers to any or all of these types of equipment.

In some embodiments, the mobile gateway device directly connects to the designated network (e.g., BACnet) of the HVAC devices, and allows a user to operate the HVAC devices. In one aspect, BACnet is a network conforming to a communications protocol for communication of building automation and control systems for applications such as heating, ventilating, and air-conditioning control (HVAC), lighting control, access control, and fire detection systems and their associated equipment. The BACnet protocol provides mechanisms for computerized building automation devices to exchange information, regardless of the particular building service they perform. The mobile gateway device may receive a user input to operate a particular HVAC device, and directly convert the user input into an instruction conforming to a BACnet protocol. In one aspect, the mobile gateway device is a portable electronic device such as a smart phone or a tablet PC with a firmware or a software application installed on the portable electronic device to convert the user input into the instruction conforming to the BACnet protocol. Accordingly, a user may control the HVAC devices through inexpensive computing devices (e.g., smart phones or table PCs) by bypassing communication through an intermediate network (e.g., a master-slave/token passing (MSTP) network) to access the BACnet and by omitting usage of expensive interface controllers (e.g., MSTP controllers).

Building and HVAC System

Figure 1:
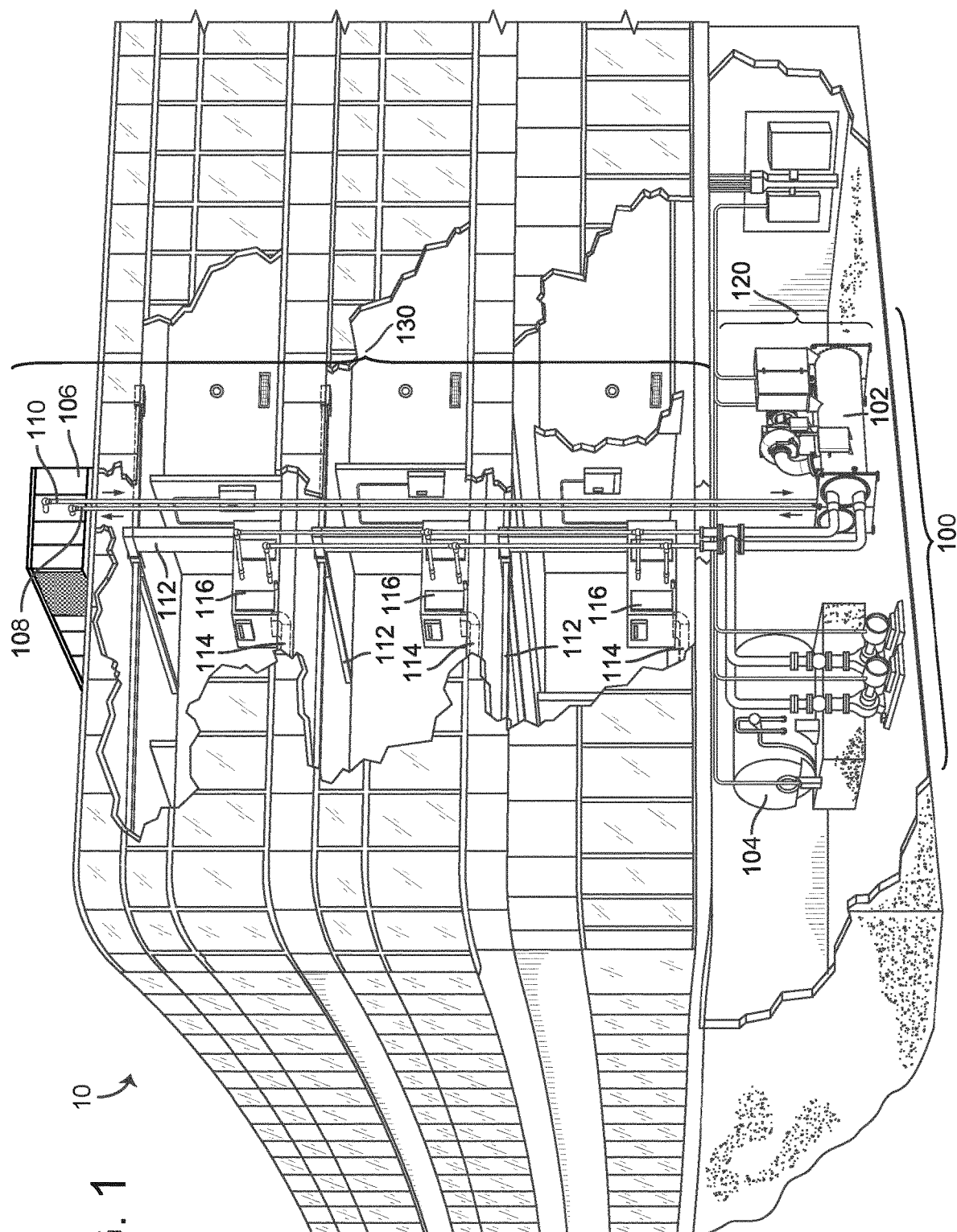
FIG. 1 is a drawing of a building equipped with an HVAC system, according to some embodiments.
Figure 2:
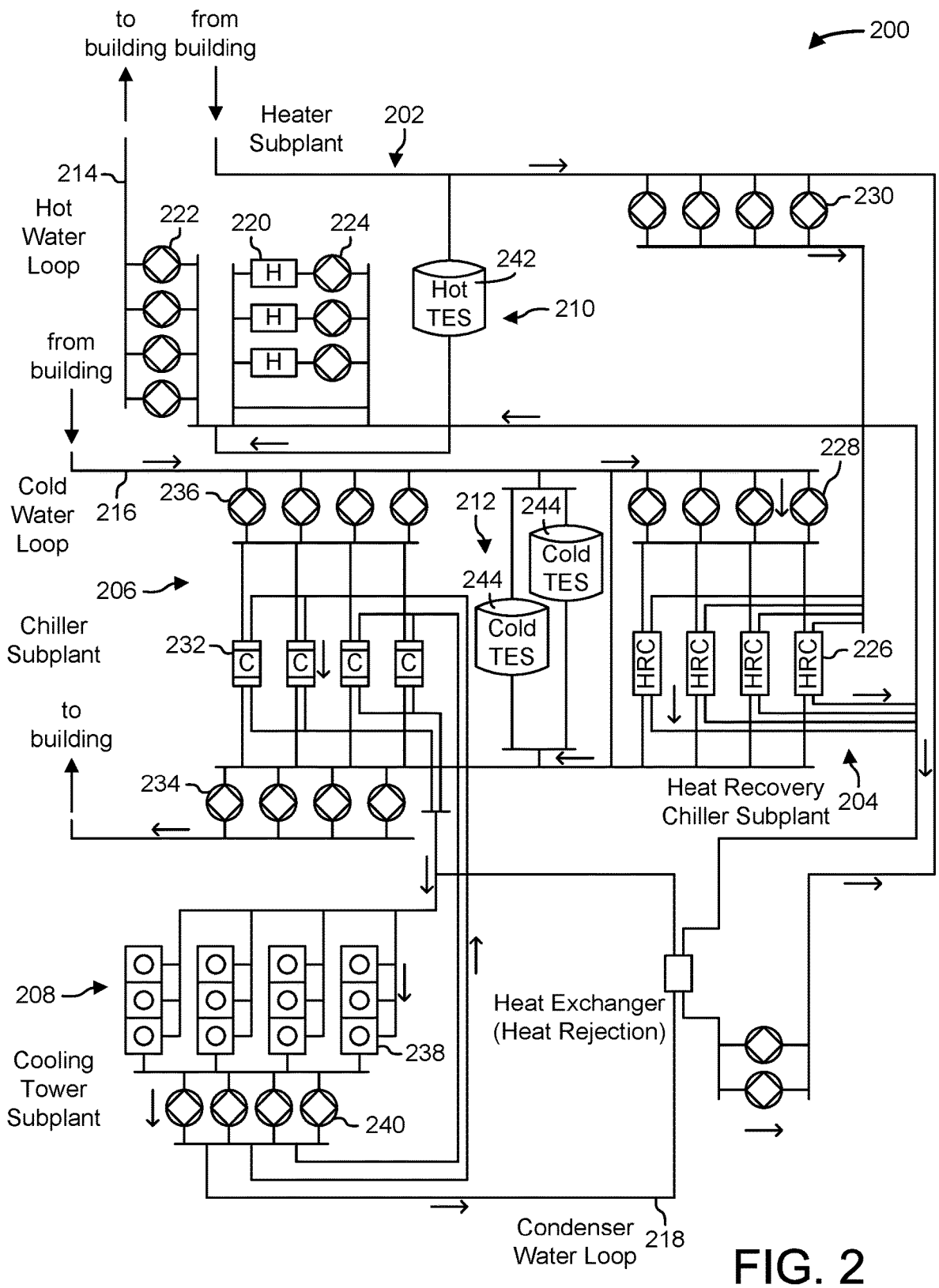
FIG. 2 is a schematic of a waterside system, which can be used as part of the HVAC system of FIG. 1, according to some embodiments.
Figure 3:
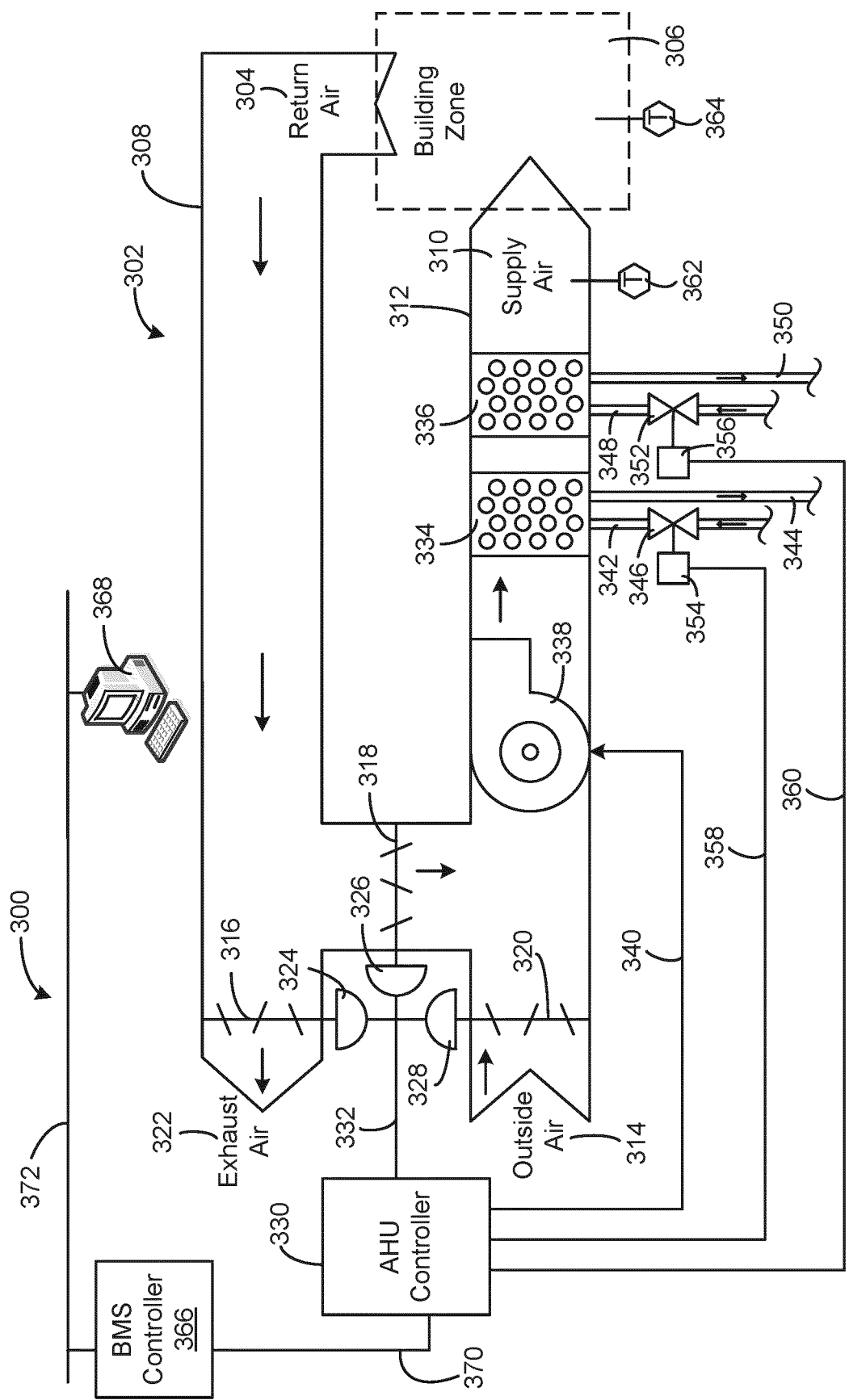
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or nonmobile device. Client device 368 can communicate with BMS controller 366 and/or AHU controller 330 via communications link 372.

HVAC Communication Architecture

Figure 4:
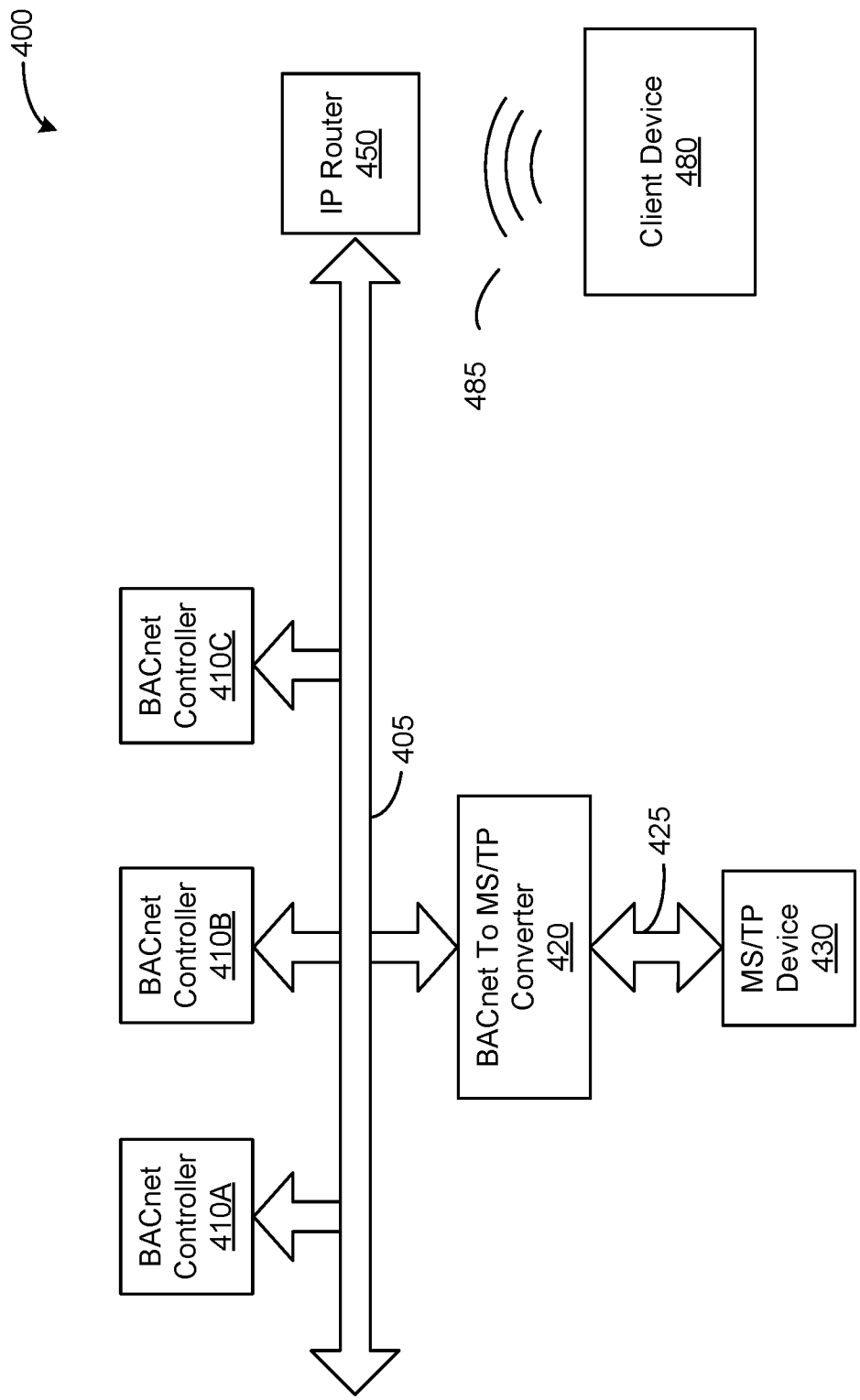
FIG. 4 is a block diagram of an example communication architecture of the HVAC system, according to some embodiments.

Referring to FIG. 4, illustrated is a block diagram of an example communication architecture 400 of the HVAC system 100, according to some embodiments. In some embodiments, the communication architecture 400 includes BACnet IP controllers 410A, 410B, 410C, an IP router 450, a BACnet IP to MS/TP converter 420, a MS/TP device 430, and a client device 480. The BACnet IP controllers 410 (also referred to as "BACnet controllers 410" herein) and the MS/TP device 430 may be the AHU controller 330, the BMS controller 366, or a combination of them, and the client device 480 may be the client device 368 of FIG. 3. In one configuration, the BACnet IP controllers 410A, 410B, 410C, the IP router 450, and the BACnet IP To MS/TP converter 420 (also referred to as a "MS/TP converter 420" herein) are coupled to each other through an IP network 405. The MS/TP converter 420 and the MS/TP device 430 are coupled to each other through an MSTP network 425. The IP router 450 and the client device 480 are coupled to each other through a client device network 485. In this configuration, the client device 480 communicates with the BACnet IP controllers 410 over the IP network 405 through the IP router 450. Additionally or alternatively, the client device 480 or other electronic devices may communicate with the BACnet IP controllers 410 through the MS/TP device 430 and the MS/TP converter 420 over the IP network 405 and the MSTP network 425. In other embodiments, the communication architecture 400 includes more, fewer, or different components than shown in FIG. 4.

The BACnet IP controller 410 is a hardware device that controls operations of HVAC devices. In one aspect, each BACnet IP controller 410 is coupled to associated HVAC devices through a communication link (e.g., hardwire or any electrical connection), and the BACnet IP controllers 410 are coupled to each other through the IP network 405. In this configuration, the BACnet IP controllers 410 may communicate with other devices through the BACnet protocol over the IP network 405, and control operations of associated HVAC devices. In one example, the BACnet IP controller 410 can read status information from the associated HVAC devices, configure set points, schedule events, etc. through the BACnet protocol.

The MS/TP converter 420 is a hardware gateway device interfacing between the BACnet IP controllers 410 and the MS/TP device 430 in different communication protocols. The MS/TP converter 420 is coupled to the BACnet IP controllers 410 through the IP network 405. In addition, the MS/TP converter 420 is coupled to the MS/TP device 430 through the MSTP network 425. In this configuration, the MS/TP converter 420 receives instructions represented in the MSTP protocol from the MS/TP device 430. The instructions may be a request for each of BACnet devices to broadcast its identity, a request to specify a particular BACnet device to report its status, a request to update a configuration of a particular BACnet device, etc. A BACnet device may be a HVAC device, a BACnet IP controller 410, or a combination of them. The MS/TP converter 420 converts instructions represented in the MSTP protocol into the BACnet protocol, and forwards the converted instructions to one or more of the BACnet IP controllers 410 through the IP network 405. In addition, the MS/TP converter 420 receives response information (or response message) represented in the BACnet protocol from one or more of the BACnet IP controllers 410. The response message may include status information indicating a status of a BACnet device, property information indicating detailed operating parameters or properties of the BACnet device, identification information indicating the BACnet device, etc. The MS/TP converter 420 converts the response message represented in the BACnet protocol into the MSTP protocol, and forwards the converted response message to the MS/TP device 430 through the MSTP network 425.

The MS/TP device 430 is a hardware device allowing a client device to indirectly operate the BACnet devices through the MSTP protocol. The MS/TP device 430 is coupled to the MS/TP converter 420 through the MSTP network 425. In addition, the MS/TP device 430 is communicatively coupled to a client device (e.g., the client device 480 or other computing devices), for example, through a client device network (e.g., Bluetooth network or different IP network). Through the client device communicatively coupled to the MS/TP device 430, a user may access status information of BACnet devices or configure operations of the BACnet devices. In one approach, the MS/TP converter 420 receives instructions represented in a client device network protocol (e.g., Bluetooth protocol or a different IP network protocol) from the client device, converts the instructions represented in the client device network protocol into the MSTP protocol, and forwards the converted instructions to the MS/TP converter 420 through the MSTP network 425. In addition, the MS/TP device 430 receives response message represented in the MSTP protocol from the MS/TP converter 420, converts the response message represented in the MSTP protocol into the client device network protocol, and forwards the converted response message to the client device through the client device network.

The IP router 450 is a hardware routing device allowing a client device 480 to directly access the BACnet devices. In one implementation, the IP router 450 is coupled to the BACnet IP controller 410 through the IP network 405, and coupled to the client device 480 through a client device network 485 (e.g., Bluetooth network, Wi-Fi network, 3G, 4G, 5G network, etc.). In this configuration, the IP router 450 may receive instructions represented in the BACnet protocol from the client device 480, and may directly forward the instructions represented in the BACnet protocol to one or more of the BACnet IP controllers 410 through the IP network 405, while bypassing the MS/TP device 430 and the MS/TP converter 420. Similarly, the IP router 450 may directly receive response message represented in the BACnet protocol from the BACnet IP controllers 410 through the IP network 405, and may directly forward the response message represented in the BACnet protocol to the client device 480 through the client device network 485.

The client device 480 is a computing device that allows a user to control the BACnet devices through the IP router 450. In one aspect, the client device 480 provides a user interface to a user. The client device 480 may receive the user input through the user interface, and generate instructions indicating actions to be executed by the BACnet devices to perform the user input. The instructions may be represented in the BACnet protocol. Similarly, the client device 480 may receive the response message represented in the BACnet protocol, and generate a representation of the response message indicating a status of a HVAC device or the BACnet IP controller 410 through a user interface. Accordingly, the client device 480 allows a user to check statuses of operating BACnet devices and control the BACnet devices, while bypassing the MS/TP converter 420 and the MS/TP device 430. Detailed implementations and operations of the client device 480 are provided below with respect to FIGS. 5 through 8 below.

Figure 5:
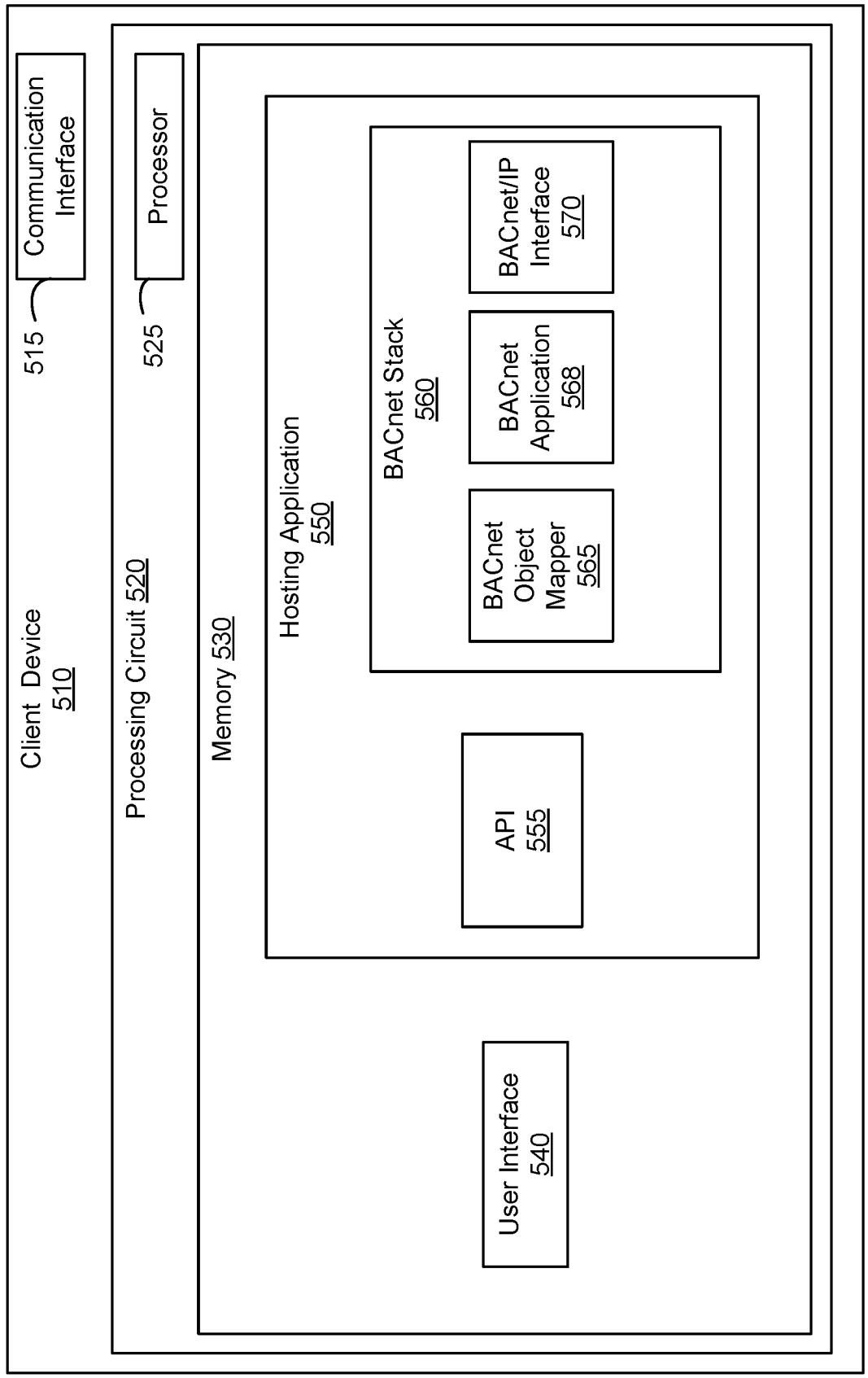
FIG. 5 is a block diagram of a mobile gateway device of FIG. 4, according to some embodiments.

Referring to FIG. 5, illustrated is a block diagram of a client device 510, according to some embodiments. In some embodiments, the client device 510 is the client device 480 of FIG. 4. In one configuration, the client device 510 includes a communication interface circuit 515 and a processing circuit 520. These components operate together to allow the client device 510 to directly communicate with the HVAC devices through the BACnet protocol. In some embodiments, the client device 510 includes additional, fewer, or different components than shown in FIG. 5.

The communication interface circuit 515 facilitates communication of the client device 510 with other HVAC devices (e.g., heaters, chillers, air handling units, pumps, fans, thermal energy storage, etc.) or BACnet IP controllers 410. In one aspect, the communication interface circuit 515 communicates with the BACnet IP controllers 410 through the IP network 405 in the BACnet protocol. In particular, the communication interface circuit 515 receives communication from the IP network 405 in the BACnet protocol and transmits communication to the IP network 405 in the BACnet protocol. In one aspect, the communication interface circuit 515 communicates with the BACnet controller 410 through the IP network 405 according to the BACnet protocol, while bypassing communication through the MSTP network 425. The communication interface circuit 515 can be or include wired or wireless communications interfaces (e.g., jacks, antennas, transmitters, receivers, transceivers, wire terminals, etc.). In various embodiments, communications via the communication interface circuit 515 can be direct (e.g., local wired or wireless communications) or via a communications network (e.g., a WAN, the Internet, a cellular network, etc.). For example, the communication interface circuit 515 can include an Ethernet/USB/RS232/RS485 card and port for sending and receiving data through a network. In another example, the communication interface circuit 515 can include a Wi-Fi transceiver for communicating via a wireless communications network. In another example, the communication interface circuit 515 can include cellular or mobile phone communication transceivers.

The processing circuit 520 is a hardware circuit executing instructions to directly communicate with BACnet devices through the BACnet protocol. In one embodiment, the processing circuit 520 includes a processor 525, and memory 530 storing instructions (or program code) executable by the processor 525. The memory 530 may be any non-transitory computer readable medium. In one embodiment, the instructions executed by the processor 525 cause the processor 525 to form software modules including a user interface 540 and a hosting application 550. In other embodiments, some functionalities performed by the processing circuit 520 may be implemented by a reconfigurable circuit (e.g., field programmable gate array (FPGA)), an application specific integrated circuit (ASIC), or any circuitries, or a combination of software modules and hardware modules.

The user interface 540 is a software module that receives a user input to operate one or more BACnet devices and to generate representations of the one or more BACnet devices. In one example, the user interface 540 allows a user to initiate a search sequence to detect operable BACnet devices and generates a corresponding instruction to execute the user input. In addition, the user interface 540 may receive response message from the BACnet devices, and present a list of operable BACnet devices, or statuses of the BACnet devices. Moreover, the user interface 540 may receive a user input to configure statuses or operating parameters of selected BACnet devices, and generate a corresponding instruction to execute the user input. Furthermore, the user interface 540 may receive updated response message indicating updated status information of the BACnet devices, and render representations of the updated statuses of the selected BACnet devices.

The hosting application 550 is a software module that converts communication between the user interface 540 and the IP network 405. In one embodiment, the hosting application 550 includes an application programming interface (API) 555 and a BACnet stack 560. The BACnet stack 560 further includes a BACnet object mapper 565, a BACnet application 568, and a BACnet/IP interface 570. Together, these components operate to convert the user instruction from the user interface 540 to conform to the BACnet protocol, and convert the response message in the BACnet protocol into a format accessible by the user interface 540. In other embodiments, the hosting application 550 includes more, fewer, or different components than shown in FIG. 5.

The API 555 is a software module that interfaces between the user interface 540 and the BACnet stack 560. In one aspect, the API 555 provides endpoints, which are utilized by the user interface 540 to integrate with the BACnet stack. For example, the API 555 receives a user instruction specifying certain operations to be performed by a target BACnet device, and the API 555 converts the instruction into an instruction conforming to the BACnet stack 560. For another example, the API 555 receives response message conforming to the BACnet stack into a format that can be processed by the user interface 540. Examples of the API 555 functions are provided below.

Example API Functions

InitializeProtocolEngine—This API sets up and initializes the BACnet protocol engine, so that it can communicate on the network.

DeviceDiscovery—This API discovers devices (IP controllers, MSTP Controllers in the FIG. 4) in the BACnet network.

PointDiscovery—This API discovers the points of a specific device and returns the list of points for that device. The device in picture could be any device discovered through the DeviceDiscovery API.

ReadProperty—This API reads the property of a point discovered through PointDiscovery API.

WriteProperty—This API is used to change/update the value of a property of a point discovered through PointDiscovery API.

The BACnet object mapper 565 is a software module that maps BACnet devices into corresponding objects. By creating an object associated with a BACnet device, identification and properties (e.g., statuses, setpoints, etc.) of the BACnet device can be stored, and provided to the user interface for presentation.

The BACnet application 568 is a software module that receives instructions in the BACnet stack from the API 555, and executes the instructions. For example, the BACnet application 568 receives instructions to execute alarm and event services, object services, BACnet encoding/decoding, etc., and generates corresponding instructions in the BACnet protocol. For another example, the BACnet application 568 receives response messages indicating statuses of the BACnet devices in the BACnet protocol, and forwards the compiled response messages to the API 555 conforming to the BACnet stack.

The BACnet/IP interface 570 is a software module that communicates with the BACnet devices through the IP network 405. The BACnet/IP interface 570 may receive instructions in the BACnet protocol from the BACnet application and transmit the instructions to the IP router 450, for example, through the communication interface circuit 515. The BACnet/IP interface 570 may also receive response message in the BACnet protocol from the IP router 450, for example, through the communication interface circuit 515, and forwards the response message to the BACnet application 568.

Figure 6:
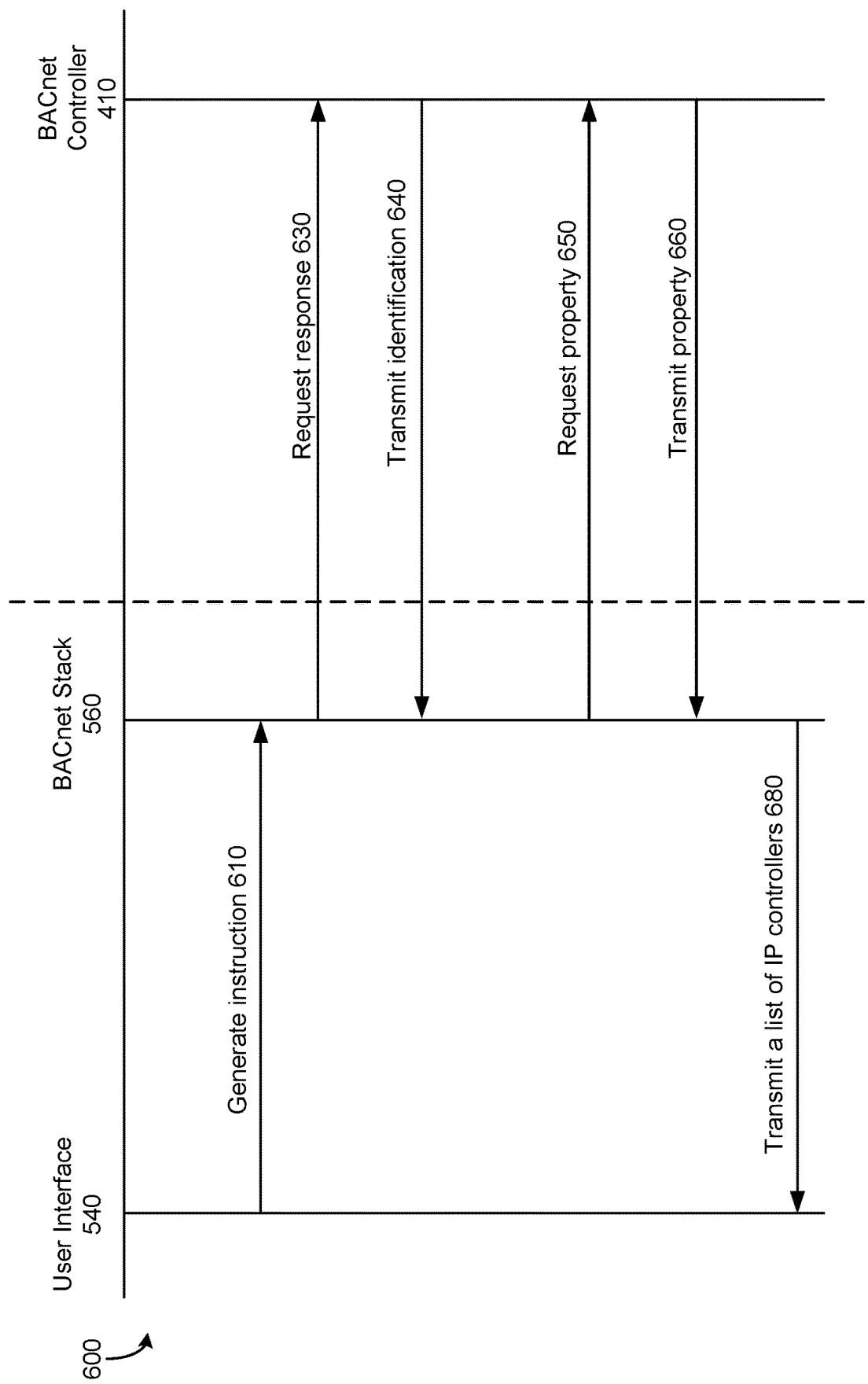
FIG. 6 illustrates a timing diagram illustrating a process of detecting HVAC devices through a mobile gateway device, according to some embodiments.

Referring to FIG. 6, illustrated is a timing diagram illustrating a process 600 of detecting operable HVAC devices through a mobile gateway device (e.g., client device 510), according to some embodiments. The process 600 may be performed by the user interface 540, the BACnet stack 560, and the BACnet IP controller 410 of FIGS. 4 and 5. In some embodiments, the process 600 may be performed by other entities. In some embodiments, the process 600 may include additional, fewer, or different steps than shown in FIG. 6.

The user interface 540 receives a user input to initiate the search sequence to detect operable HVAC devices. The user may select a button or an icon displayed on a display screen to start the search sequence. Alternatively or additionally, the user may manually enter a command to start the search sequence. In response to the user input, the user interface 540 generates an instruction indicating a user request to initiate the search sequence, and transmits the instruction to the BACnet stack 560, for example, through the API 555 (step 610).

The BACnet stack 560 receives the instruction to initiate the search sequence, and generates a request response message in the BACnet protocol according to the received instruction. The request response message is a message requesting identification information of BACnet devices receiving the request response message. The request response message may identify an identification of the BACnet stack 560 (or the client device 510) broadcasting the request response. The BACnet stack 560 may broadcast the request response message to the BACnet IP controllers 410 through the IP network 405 (step 630). In response to the request response message, each BACnet IP controller 410 transmits, in the BACnet protocol, a list of identifications of associated HVAC devices in operation to the BACnet stack 560 identified by the request response message (step 640). In some embodiments, in response to the request response message, the BACnet IP controller 410 instructs each of the associated HVAC devices to transmit its identification to the BACnet stack 560 in the BACnet protocol. The BACnet stack 560 can compile the received identifications in the BACnet protocol and generate a list of operable BACnet devices.

The BACnet stack 560 transmits a request property message to operable BACnet IP controllers 410 in the BACnet protocol (step 650). The request property message is a message requesting property information of the BACnet devices. In one approach, the BACnet stack 560 transmits a request property message to operable BACnet IP controllers 410, in response to receiving a user request, in response to generating the list of operable BACnet devices, or both. The request property message may include an identification of the BACnet stack 560 (or the client device 510) transmitting the request property message. In response to the request property message, each BACnet IP controller 410 transmits property information (e.g., status, operating parameters, set points, etc.) of the HVAC devices to the BACnet stack 560 identified by the request property message in the BACnet protocol (step 660). In some embodiments, in response to the request property message, the BACnet IP controller 410 instructs each of the associated HVAC devices to transmit its property information to the BACnet stack 560. The BACnet stack 560 can compile the received property information in the BACnet protocol and generate a list of operable BACnet devices with associated property information in a format recognized by the user interface 540.

The BACnet stack 560 forwards a list of operable BACnet devices and property information to the user interface 540, for example through the API 555 (step 680). In one approach, the BACnet stack 560 forwards the list of operable BACnet devices and property information to the user interface 540, automatically after the list of operable BACnet devices with associated property information is generated, in response to a request from the user interface 540, or periodically. The user interface may render a representation of a list of operable BACnet devices and property information to the user.

Figure 7:
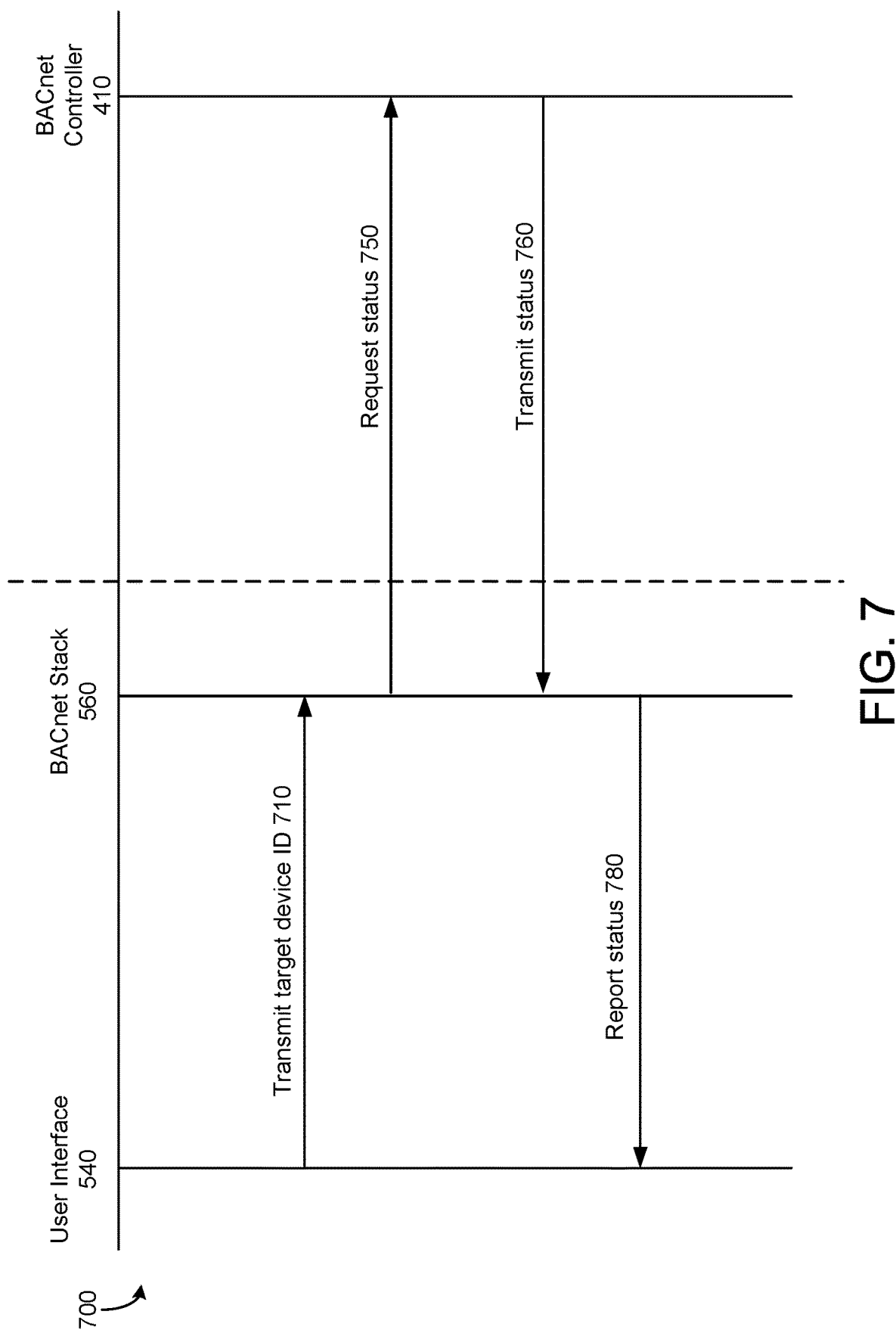
FIG. 7 illustrates a timing diagram illustrating a process of obtaining statuses of HVAC devices through a mobile gateway device, according to some embodiments.

Referring to FIG. 7, illustrated is a timing diagram illustrating a process 700 of obtaining statuses of HVAC devices through a mobile gateway device (e.g., client device 510), according to some embodiments. The process 700 may be performed by the user interface 540, the BACnet stack 560, and the BACnet IP controller 410 of FIGS. 4 and 5. In some embodiments, the process 700 may be performed by other entities. In some embodiments, the process 700 may include additional, fewer, or different steps than shown in FIG. 7.

The user interface 540 receives a user input to obtain a status of a particular HVAC device. The user may select, from a list of HVAC devices, a target HVAC device to check the status through the user interface 540. In response to the user input, the user interface 540 generates an instruction indicating a user request to confirm a status of a target device, and transmits the instruction with an identification of the target device (i.e., target device ID) to the BACnet stack 560, for example, through the API 555 (step 710).

The BACnet stack 560 receives the instruction to confirm the status of the target device with the target device ID, and generates a request status message according to the received instruction (step 750). The request status message is a message requesting the status of the target device in the BACnet protocol. The request status message may include an identification of the BACnet stack 560 (or the client device 510) transmitting the request status message in the BACnet protocol. The BACnet stack 560 may identify a BACnet IP controller 410 associated with the target device ID, and transmit the request status message to the identified BACnet IP controller 410 through the IP network 405 in the BACnet protocol. In response to the request status message, the BACnet IP controller 410 associated with the target device ID transmits status information indicating a status of the target device to the BACnet stack 560 in the BACnet protocol (step 760). For example, the status information indicates an operating status (e.g., temperature, pressure, power level, setpoints, scheduled events, etc.) of the BACnet device. In some embodiments, in response to the request status message, the BACnet IP controller 410 instructs the target device to transmit its status information to the BACnet stack 560.

The BACnet stack 560 receives the status information in the BACnet protocol, and generates a status response message according to the received status information. The status response message is a message indicating the status of the target device in a format recognized by the user interface 540. The BACnet stack 560 forwards the status response message to the user interface 540, for example through the API 555 (step 780). The user interface may render a representation of the status of the target device according to the status response message.

Figure 8:
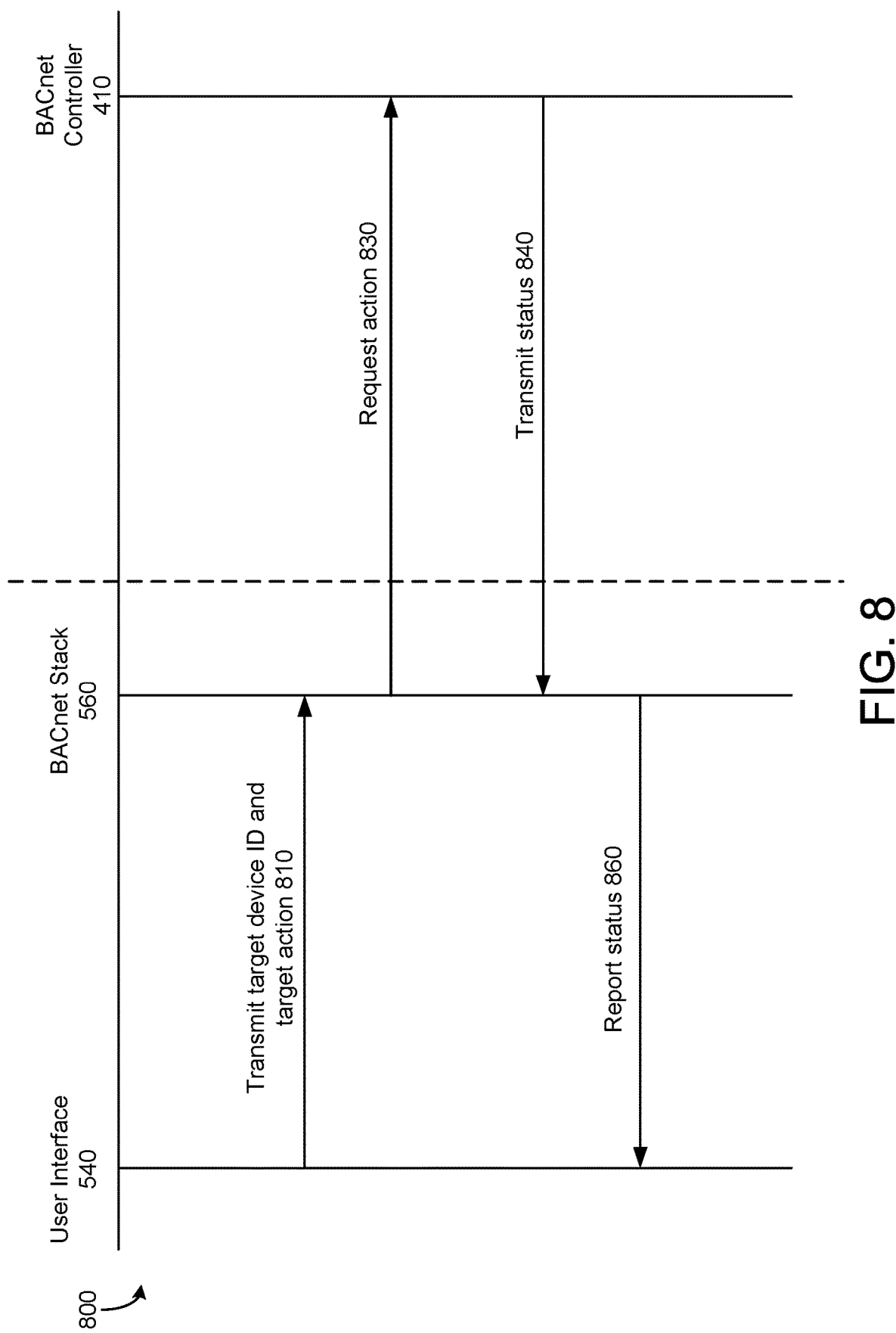
FIG. 8 illustrates a timing diagram illustrating a process of operating HVAC devices through a mobile gateway device, according to some embodiments.

Referring to FIG. 8, illustrated is a timing diagram illustrating a process 800 of operating HVAC devices through a mobile gateway device (e.g., client device 510), according to some embodiments. The process 800 may be performed by the user interface 540, the BACnet stack 560, and the BACnet IP controller 410 of FIGS. 4 and 5. In some embodiments, the process 800 may be performed by other entities. In some embodiments, the process 800 may include additional, fewer, or different steps than shown in FIG. 8.

The user interface 540 receives a user input to change a status of a particular HVAC device. The user interface 540 may present a list of available HVAC devices, and the user may select, from the list of HVAC devices, a target HVAC device to perform a target action through the user interface 540. In addition, the user interface 540 may determine a list of actions executable by the selected HVAC device and present the list of executable actions to the user. The user may select a target action to be performed by the selected target device through the user interface 540. For example, the user may select a target device to change its set temperature value, a power setting, a scheduled event, etc. In response to the user input, the user interface 540 generates an instruction indicating a user request to execute the target action by a target device, and transmits the instruction with an identification of the target device to the BACnet stack 560, for example, through the API 555 (step 810).

The BACnet stack 560 receives the instruction to perform an action by the target device with the target device ID, and generates a request action message according to the received instruction (step 830). The request action message is a message requesting the target device to execute the requested action. The request action message may include an identification of the BACnet stack 560 (or the client device 510) transmitting the request action message in the BACnet protocol. The BACnet stack 560 may identify a BACnet IP controller 410 associated with the target device ID, and transmit, in the BACnet protocol, the request action message to the identified BACnet IP controller 410 through the IP network 405. In response to the request action message, the BACnet IP controller 410 associated with the target device ID causes the target device to execute the requested action, and transmits status information confirming the executed action in the BACnet protocol (step 840).

The BACnet stack 560 receives the status information in the BACnet protocol indicating the action executed by the target device, and generates a status response message according to the received status information. The status response message is a message indicating the status of the target device in a format recognized by the user interface 540. The BACnet stack 560 forwards the status response message to the user interface 540, for example, through the API 555 (step 860). In response to the status response message, the user interface may render a representation of the status of the target device confirming the requested action being executed.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A mobile gateway device for controlling building equipment, the mobile gateway device comprising:
   a processing circuit comprising a processor and memory storing instructions executed by the processor, the processing circuit configured to:
   receive a user input to change a status of a device of the building equipment;
   generate a request action message indicating the user input based on an application programming interface of the mobile gateway device, the request action message conforming to a building automation and control network (BACnet) protocol; and
   transmit, through an internet protocol network, the request action message conforming to the BACnet protocol to a BACnet controller, the BACnet controller to operate the device according to the request action message conforming to the BACnet protocol.

2. The mobile gateway device of claim 1, further comprising a communication interface circuit coupled to the internet protocol network, the communication interface circuit to receive communication from the internet protocol network in the BACnet protocol and transmit communication to the internet protocol network in the BACnet protocol.

3. The mobile gateway device of claim 2, wherein the communication interface circuit is configured to communicate with the BACnet controller through the internet protocol network according to the BACnet protocol, while bypassing communication through a MSTP network.

4. The mobile gateway device of claim 1, wherein the processing circuit is configured to:
receive another user input to obtain a list of operable devices of the building equipment;
generate a request response message requesting identifications of operable devices of the building equipment based on the application programming interface of the mobile gateway device, the request response message conforming to the BACnet protocol;
transmit, through the internet protocol network, the request response message conforming to the BACnet protocol to the BACnet controller, the BACnet controller to generate the list of operable devices in response to the request response message; and
receive, through the internet protocol network, the list of operable devices of the building equipment from the BACnet controller.

5. The mobile gateway device of claim 1, wherein the processing circuit is configured to:
receive, through the internet protocol network, status information confirming a changed status of the device, the status information conforming to the BACnet protocol; and
render a representation of the changed status of the device.

6. The mobile gateway device of claim 1, wherein the processing circuit is configured to:
receive another user input to obtain a status of another device of the building equipment;
generate a request status message requesting the status of the other device based on the application programming interface of the mobile gateway device, the request status message conforming to the BACnet protocol; and
transmit, through the internet protocol network, the request status message conforming to the BACnet protocol to the BACnet controller, the BACnet controller to obtain the status of the other device according to the request status message conforming to the BACnet protocol.

7. The mobile gateway device of claim 1, wherein the processing circuit is configured to transmit, to an internet protocol router communicatively coupled to the BACnet controller through the internet protocol network, the request action message conforming to the BACnet protocol to provide the request action message to the BACnet controller.

8. The mobile gateway device of claim 1, wherein the mobile gateway device comprises at least one of a smart phone device and a tablet device.

9. A non-transitory computer readable medium storing instructions for controlling building equipment by a mobile gateway device, the instructions when executed by one or more processors cause the one or more processors to:
receive a user input to change a status of a device of the building equipment;
generate a request action message indicating the user input based on an application programming interface of the mobile gateway device, the request action message conforming to a building automation and control network (BACnet) protocol; and
transmit, through an internet protocol network, the request action message conforming to the BACnet protocol to a BACnet controller, the BACnet controller to operate the device according to the request action message conforming to the BACnet protocol.

10. The non-transitory computer readable medium of claim 9, wherein the instructions when executed by the one or more processors cause the one or more processors to receive communication from the internet protocol network in the BACnet protocol and transmit communication to the internet protocol network in the BACnet protocol.

11. The non-transitory computer readable medium of claim 10, wherein the instructions when executed by the one or more processors cause the one or more processors to communicate with the BACnet controller through the internet protocol network according to the BACnet protocol, while bypassing communication through a MSTP network.

12. The non-transitory computer readable medium of claim 9, wherein the instructions when executed by the one or more processors cause the one or more processors to:
receive another user input to obtain a list of operable devices of the building equipment;
generate a request response message requesting identifications of operable devices of the building equipment based on the application programming interface of the mobile gateway device, the request response message conforming to the BACnet protocol;
transmit, through the internet protocol network, the request response message conforming to the BACnet protocol to the BACnet controller, the BACnet controller to generate the list of operable devices in response to the request response message; and
receive, through the internet protocol network, the list of operable devices of the building equipment from the BACnet controller.

13. The non-transitory computer readable medium of claim 9, wherein the instructions when executed by the one or more processors cause the one or more processors to:
receive, through the internet protocol network, status information confirming a changed status of the device, the status information conforming to the BACnet protocol; and
render a representation of the changed status of the device.

14. The non-transitory computer readable medium of claim 9, wherein the instructions when executed by the one or more processors cause the one or more processors to:
receive another user input to obtain a status of another device of the building equipment;
generate a request status message requesting the status of the other device based on the application programming interface of the mobile gateway device, the request status message conforming to the BACnet protocol; and
transmit, through the internet protocol network, the request status message conforming to the BACnet protocol to the BACnet controller, the BACnet controller to obtain the status of the other device according to the request status message conforming to the BACnet protocol.

15. The non-transitory computer readable medium of claim 9, wherein the instructions when executed by the one or more processors cause the one or more processors to transmit, to an internet protocol router communicatively coupled to the BACnet controller through the internet protocol network, the request action message conforming to the BACnet protocol.

16. The non-transitory computer readable medium of claim 9, wherein the mobile gateway device comprises at least one of a smart phone device and a tablet device.

17. A method of controlling building equipment by a mobile gateway device, the method comprising:
- receiving, by the mobile gateway device, a user input to change a status of a device of the building equipment;
- generating, by the mobile gateway device, a request action message indicating the user input based on an application programing interface of the mobile gateway device, the request action message conforming to a building automation and control network (BACnet) protocol; and
- transmitting, by the mobile gateway device, through an internet protocol network, the request action message conforming to the BACnet protocol to a BACnet controller, the BACnet controller to operate the device according to the request action message conforming to the BACnet protocol.

18. The method of claim 17, further comprising:
- receiving another user input to obtain a list of operable devices of the building equipment;
- generating a request response message requesting identifications of operable devices of the building equipment based on the application programming interface of the mobile gateway device, the request response message conforming to the BACnet protocol;
- transmitting, through the internet protocol network, the request response message conforming to the BACnet protocol to the BACnet controller, the BACnet controller to generate the list of operable devices in response to the request response message; and
- receiving, through the internet protocol network, the list of operable devices of the building equipment from the BACnet controller.

19. The method of claim 17, further comprising:
- receiving, through the internet protocol network, status information confirming a changed status of the device, the status information conforming to the BACnet protocol; and
- rendering a representation of the changed status of the device.

20. The method of claim 17, wherein the mobile gateway device comprises at least one of a smart phone device and a tablet device.

* * * * *